United States Patent
Miyama et al.

(10) Patent No.: US 6,262,138 B1
(45) Date of Patent: Jul. 17, 2001

(54) EXTRUSION-FOAMED BOARD OF RESIN BLEND COMPRISING MODIFIED POLYPROPYLENE RESIN AND POLYSTYRENE RESIN

(75) Inventors: Osamu Miyama, Ibaraki; Haruo Tomita, Kobe, both of (JP)

(73) Assignee: Kaneka Corporation, Tokyo (JP)

( * ) Notice: Subject to any disclaimer, the term of this patent is extended or adjusted under 35 U.S.C. 154(b) by 0 days.

(21) Appl. No.: 09/582,938

(22) PCT Filed: Nov. 9, 1999

(86) PCT No.: PCT/JP99/06221

§ 371 Date: Jul. 7, 2000

§ 102(e) Date: Jul. 7, 2000

(87) PCT Pub. No.: WO00/27906

PCT Pub. Date: May 18, 2000

(30) Foreign Application Priority Data

Nov. 11, 1998 (JP) .................................................. 10-320818
Jan. 29, 1999 (JP) .................................................. 11-020958

(51) Int. Cl.[7] ...................................................... C08J 9/00
(52) U.S. Cl. ............................. 521/139; 521/79; 521/81; 521/134; 521/140

(58) Field of Search ...................................... 521/134, 139, 521/140, 81, 79

(56) References Cited

FOREIGN PATENT DOCUMENTS

| 62-174237 | 7/1987 | (JP) . |
| 6-49261 | 2/1994 | (JP) . |
| 10-24436 | 1/1998 | (JP) . |
| 11-80401 | 3/1999 | (JP) . |

*Primary Examiner*—Morton Foelak
(74) *Attorney, Agent, or Firm*—Armstrong, Westerman, Hattori, McLeland & Naughton, LLP

(57) ABSTRACT

There is provided a foamed article having a low density, large thickness, a high closed cell ratio and a small average cell diameter. A foamed extrusion article having a density of 50 to 10 kg/m$^3$ and a closed cell ratio of at least 40% is obtained by mixing a mixed resin comprising (a) 50 to 95 parts by weight of a polypropylene resin having a melt tension at 230° C. of at least 0.05 N, (b) 50 to 5 parts by weight of a polystyrene resin, and (c) 0.5 to 15.0 parts by weight of a hydrogenated block copolymer of styrene, isoprene and styrene based on 100 parts by weight of the polypropylene resin (a) and the polystyrene resin (b) with a foaming agent in an extruder, and then releasing into a low-pressure zone.

3 Claims, No Drawings

EXTRUSION-FOAMED BOARD OF RESIN BLEND COMPRISING MODIFIED POLYPROPYLENE RESIN AND POLYSTYRENE RESIN

TECHNICAL FIELD

The present invention relates to a foamed extrusion board of the mixed resin comprising a polypropylene resin and a styrene resin. More specifically, it relates to a foamed extrusion board of the mixed resin comprising a polypropylene resin and a styrene resin, which can be suitably used for, for example, structural materials and heat insulating materials such as walls and floor partitions of buildings.

BACKGROUND ART

Since the foamed article comprising a thermoplastic resin has generally lightweight, good heat insulating property and cushioning property against outside stress, it is widely used for many fields such as heat-insulating material, cushioning material, core material and food containers.

In the foamed article comprising a polyolefin resin used as a base resin, low-density polyethylene is mainly utilized. But the polyethylene resin has a defect of insufficient heat resistance. On the other hand, a polypropylene resin has high elasticity and is excellent in chemical resistance, heat resistance, hinge characteristics and the like. Consequently, when the foamed article is prepared with the polypropylene resin, an extremely wide range of applications can be expected. But it is extremely difficult to prepare the foamed article having a large wall thickness as in case of a polypropylene resin, since viscosity and tension at melting is low, and strength of the cell wall at foaming is not sufficiently kept.

As an attempt to overcome these difficulties, foaming methods using polypropylene with a high melt tension are disclosed in Japanese Unexamined Patent Publication No. 43766/1978, Japanese Unexamined Patent Publication No. 197132/1982, Japanese Unexamined Patent Publication No. 363227/1992, and the like. However, even if these methods are used, satisfactory foamed boards have not yet been obtained.

In recent years, a method for producing sheet-like foamed article by using polypropylene with a long chain branching structure has been reported as in Japanese Unexamined Patent Publication No. 506875/1993. However, in the above-mentioned method, only the foamed article with wall thickness less than 10 mm can be prepared, and the foamed article having excellent impact resistance and cushioning property can not be obtained due to corrugates or voids generation.

Japanese unexamined Patent Publication No. 504471/1996 discloses a foamed article of propylene having an expansion factor F (density of foamed article×average cell particle size×tan $\delta^{0.75}$) of less than 1.8. However, because of a special method of a convergent foam by a porous die, the method has a defect that thick foamed article can be obtained only by the foamed article with defects in quality.

Japanese Unexamined Patent Publication No. 252318/1995 discloses a polypropylene resin for foamed extrusion article having thick wall, of which biaxial elongation viscosity is specified. However, the resin is a special linear polypropylene resin containing a super high molecular weight component, which has Mz of more than $8\times10^6$ and Mz/Mw of more than 10, and the disclosed preparing method is a special method of the two-step polymerization.

On the other hand, as the foamed article of a mixed resin comprising polyolefin and polystyrene, a foamed article of a mixture using a block copolymer of hydrogenated styrene and butadiene as a compatibilizer is disclosed in Japanese Unexamined Patent Publication No. 32263/1975. However, in this publication, only polyethylene is described as polyolefin and polypropylene is not described.

In addition, Japanese Unexamined Patent Publication No. 174237/1987 discloses a foamed article of mixed resin comprising polyolefin and polystyrene by using a special hydrogenated block copolymer of styrene and butadiene block copolymer, in which an amount of 1, 2-binding butadiene and styrene are specified. And in this publication, an example using polypropylene as polyolefin is also disclosed. But according to this method, only the foamed article having several mm thickness is obtained.

As described above, a method for preparing the foamed article having a low density, large thickness, a high closed cell ratio and a small average cell diameter according to extrusion foaming has not yet been found by improving foamability of a polypropylene resin.

SUMMARY OF THE INVENTION

An object of the present invention is to provide a foamed extrusion board of a polypropylene resin having a low density, large thickness, high closed cell ratio, and small average cell diameter.

Namely, the present invention relates to a foamed extrusion article having a density of 50 to 10 kg/m$^3$ and a closed cell ratio of at least 40%, which is obtained by mixing a mixed resin comprising (a) 50 to 95 parts by weight of a polypropylene resin having a melt tension at 230° C. of at least 0.05 N, (b) 50 to 5 parts by weight of a polystyrene resin, and (c) 0.5 to 15.0 parts by weight of a hydrogenated block copolymer of styrene, isoprene and styrene (hereinafter referred to as "SEPS") based on 100 parts by weight of the polypropylene resin (a) and the polystyrene resin (b) with a foaming agent in an extruder, and then releasing into a low-pressure zone (claim 1), the foamed extrusion article of claim 1, wherein the polypropylene resin is the modified polypropylene resin which is modified with a monomer selected from the group consisting of isoprene, styrene and 1,3-butadiene, and a radical polymerization initiator (claim 2), a foamed extrusion article having a density of 50 to 10 kg/m$^3$ and a closed cell ratio of at least 40%, which is obtained by mixing a mixed resin comprising (a) 50 to 95 parts by weight of a polypropylene resin having a melt tension at 230° C. of at least 0.05 N, (b) 50 to 5 parts by weight of a polystyrene resin, and (c) 0.5 to 15.0 parts by weight of a hydrogenated block copolymer of styrene and butadiene (hereinafter referred to as "SEBS") based on 100 parts by weight of the polypropylene resin (a) and the polystyrene resin (b) with a foaming agent in an extruder, and then releasing into a low-pressure zone (claim 3), and the foamed extrusion article of claim 3, wherein the polypropylene resin is the modified polypropylene resin, which is modified with a monomer selected from the group consisting of isoprene, styrene and 1,3-butadiene, and a radical polymerization initiator (claim 4).

DETAILED DESCRIPTION OF THE INVENTION

In order to obtain a foamed extrusion board of a polypropylene resin having a low density, a large thickness, a high closed cell ratio, and a small average cell diameter from a polypropylene resin, it is important to lower temperature dependency of melt viscosity as well as to suppress foaming inside a die. Namely, it is necessary for the polypropylene resin to have the melt viscosity sufficient for increasing the die pressure at foaming to the pressure suppressing foaming inside the die.

The present invention has made it possible to prepare a foamed extrusion board of a polypropylene resin by using a mixed resin comprising a polypropylene resin having a melt tension of at least 0.05 N (a), a polystyrene resin (b), and SEPS (a hydrogenated block copolymer of styrene, isoprene and styrene) (c), or using a modified polypropylene resin (a) obtained by reacting a polypropylene resin with a monomer selected from the group consisting of isoprene, styrene and 1,3-butadiene, and a radical polymerization initiator. Using the mixed resin comprising the modified polypropylene resin (a), a polystyrene resin (b), and SEBS (hydrogenated block copolymer of styrene and butadiene) (c) has made it possible to prepare an excellent foamed extrusion board to complete the present invention.

Examples of the polypropylene resin (a) having melt tension at 230° C. of at least 0.05 N are polypropylene with a long-chain branch generated by electron beam radiation, linear polypropylene containing super high molecular weight component, modified polypropylene obtained by reacting the monomer selected from the group consisting of isoprene, styrene, and 1,3-butadiene, and a radical initiator, and the like. When the modified polypropylene is used, isoprene alone is most preferably used for the monomer from the viewpoint of easy handling.

The melt tension at 230° C. of the polypropylene resin (a) is preferably at least 0.05 N, and more preferably 0.06 to 0.30 N. If the value is less than 0.05 N, cells tend to be broken at foaming.

Examples of the polypropylene resin (a) are a homopolymer of propylene and a copolymer of propylene. In particular, a crystalline polymer is mentioned. As the copolymer of propylene, the copolymer containing at least 75% by weight of propylene, preferably at least 90% by weight, is preferable from the viewpoint of holding crystallinity, rigidity, chemical resistance and the like. Examples of the copolymerizable α-olefin are at least one monomer selected from the group consisting of; α-olefin having 2 carbon atoms or 4 to 12 carbon atoms such as ethylene, butene-1, isobutene, pentene-1, 3-methyl-butene-1, hexene-1, 4-methyl-pentene-1,3,4-dimethyl-butene-1, heptene- 1,3-methyl-hexene-1, octene-1 or decene-1; a cyclic olefin such as cyclopentene, norbornene or 1,4,5,8-dimethano-1,2,3,4,4a,8,8a-6-octahydronaphthalene; a diene such as 5-methylene-2-norbornene, 5-ethylidene-2-norbornene, 1,4-hexadiene, methyl-1,4-hexadiene or 7-methyl-1,6-octadiene; a vinyl monomer such as vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methyl styrene, vinyl toluene or divinylbenzene ; and the like. Among those, ethylene and butene-1 are preferable from the viewpoint of inexpensive cost.

There is no particular limitation for shape and size of the polypropylene resin, which may be either particle or pellet.

Further, if necessary, there can be added stabilizers such as antioxidant, metal deactivator, phosphorus processing stabilizer, ultraviolet ray absorber, ultraviolet ray stabilizer, fluorescent whitening agent, metallic soap, and antacid absorber; additives such as crosslinking agent, chain-transfer agent, nucleating agent, lubricant, plasticizer, filler, reinforcing agent, pigment, dye, flame retardant and antistatic agent in an amount that the effects of the present invention are not lost.

When the polypropylene resin is modified by the monomer such as isoprene, an amount of the monomer selected from the group consisting of isoprene, styrene and 1,3-butadiene is preferably 0.1 to 100 parts by weight, more preferably 0.1 to 50 parts by weight based on 100 parts by weight of the polypropylene resin, from the viewpoint of holding impact resistance and chemical resistance in the modified polypropylene resin (a), which are features of the polypropylene resin.

Examples of the monomer copolymerizable with isoprene and the like are a vinyl monomer such as styrene, methyl styrene, vinyl toluene, chlorostyrene, chloromethyl styrene, bromostyrene, fluorostyrene, nitrostyrene, vinylphenol, divinyl benzene or isopropenyl styrene; vinyl chloride; vinylidene chloride acrylonitrile; methacrylonitrile; acrylamide; methacrylamide vinyl acetate; acrylic acid; methacrylic acid; maleic acid; maleic anhydride; metal acrylate salt; metal methacrylate salt; an acrylate such as methyl acrylate, ethyl acrylate, butyl acrylate, 2-ethylhexyl acrylate or stearyl acrylate; a methacrylate such as methyl methacrylate, ethyl methacrylate, butyl methacrylate, 2-ethylhexyl methacrylate or stearyl methacrylate. These may be used in a combination use of isoprene in an equal or smaller amount of isoprene.

As the radical polymerization initiator, examples thereof are, in general, peroxides, an azo compound and the like. It is desirable that a graft reaction occurs between the polypropylene resin and a monomer such as isoprene. In order to achieve this, a so-called radical polymerization initiator having dehydrogenating capability is required, examples thereof are organic peroxides such as ketone peroxide, peroxy ketal, hydro peroxide, dialykyl peroxide, diacyl peroxide, peroxy dicarbonate and peroxy ester. Among those, the compound having high dehydrogenating capability is preferable, and examples are at least one compound selected from the group consisting of peroxy ketal such as 1,1-bis(t-butyl peroxy)3,3,5-trimethylcyclohexane, 1,1-bis(t-butyl peroxy)cyclohexane, n-butyl 4,4-bis(t-butyl peroxy)valerate, 2,2-bix(t-butyl peroxy)butane; dialkyl peroxide such as dicumyl peroxide, 2,5-dimethyl-2,5-di(t-butyl peroxy)hexane, α,α'-bis(t-butyl peroxy-m-isopropyl)benzene, t-butylcumyl peroxide, d-t-butyl peroxide or 2-5-dimethyl-2,5-di(t-butyl peroxy)hexyne-3; diacyl peroxide such as benzoyl peroxide; peroxy ester such as t-butyl peroxy octate, t-butyl peroxy isobutylate, t-butyl peroxy laurate, t-butyl peroxy 3,5,5-trimethylhexanoate, t-butyl peroxy isopropyl carbonate, 2,5-dimethyl-2,5-di(benzoyl peroxy)hexane, t-butyl peroxy acetate, t-butyl peroxy benzoate or di-t-butyl peroxy isophthalate.

An amount of the radical polymerization initiator is preferably 0.1 to 10 parts by weight, more preferably 0.5 to 5 parts by weight based on 100 parts by weight of the polypropylene resin from the viewpoint of suppressing excessive lowering of melt viscosity as well as from the viewpoint of economy.

Examples of an apparatus for reacting the polypropylene resin with the monomer such as isoprene and the radical polymerization initiator are a mixing machine such as roll, cokneader, Banbury mixer, Brabender mixer, single-screw extruder, or twin-screw extruder; a horizontal stirrer such as a twin-screw multi-disk equipment; a vertical stirrer such as a double helical ribbon stirrer. Among those, particularly, extruders are preferable from the viewpoint of productivity.

There is no particular limitation for order and method for mixing and kneading (stirring) of a polypropylene resin, a monomer such as isoprene and a radical polymerization initiator. Polypropylene resin, a monomer such as isoprene and a radical polymerization initiator may be kneaded (stirred) after mixing, or after polypropylene resin is melted, a monomer such as isoprene or a radical polymerization initiator may be simultaneously or individually mixed altogether or separately.

A temperature of the kneader (stirrer) is preferably 130 to 400° C. from the viewpoint that the polypropylene resin melts and is not thermally decomposed. And time thereof is generally 1 to 60 minutes.

The polystyrene resin (b) is preferably a homopolymer of styrene, and may be a copolymer of styrene as a main component and a monomer copolymerizable with a styrene such as α-methyl styrene, acrylonitrile, butadiene, or methyl methacrylate. Melt flow rate of the polystyrene resin is preferably 0.5 to 20 g/10 minutes (200° C.× 5 kg).

SEPS (c) is publicly known, and is a hydrogenated block copolymer of styrene, isoprene and styrene. A ratio of the styrene component is preferably 20 to 70% by weight. At least 90% of double bonds of the block copolymer is preferably hydrogenated in all double bonds. SEBS (c) is also publicly known, and is a hydrogenated block copolymer of styrene and butadiene. Molecular weight thereof is preferably 10,000 and 150,000. A ratio of the styrene component is preferably 10 to 40% by weight. At least 95% of double bonds of the block copolymer is preferably hydrogenated in all double bonds.

An amount of the polypropylene resin (a) having melt tension at 230° C. of at least 0.05 N and the polystyrene resin (b) is necessarily 50 to 95 parts by weight of the polypropylene resin (a) and 50 to 5 parts by weight of the polystyrene resin (b). It is preferably 60 to 90 parts by weight of the polypropylene resin (a) and 40 to 10 parts by weight of the polystyrene resin (b). A total amount of (a) and (b) is 100 parts by weight. If the amount of the polypropylene resin (a) is less than 50 parts by weight, properties of the polypropylene resin tend to be lost. If it is more than 90 parts by weight, improvement in foaming property becomes insufficient.

An amount of SEPS or SEBS (c) is necessarily 0.5 to 15.0 parts by weight based on total 100 parts by weight of the polypropylene resin (a) and the polystyrene resin (b). But it is preferably 1.0 to 10.0 parts by weight. If it is less than 0.5 parts by weight or more than 15 parts by weight, the closed cell ratio tends to be lowered.

Next, as the method for mixing and foaming the resins, for example, the volatile foaming agent is mixed with the above-mentioned resins at a high temperature and a high pressure. The mixture is cooled to the suitable foaming temperature, and then extruded and foamed under an atmospheric pressure. The object resin may be a resin in which pellets or powders of respective component resins are uniformly blended with a blender, a resin in which they are melt-mixed by passing the kneader extruder, or a resin in which only polystyrene and SEPS or SEBS are melt-blended and then dry-blended with the modified polypropylene.

Examples of the preferable volatile foaming agent are aliphatic hydrocarbons such as propane, butane, isobutane, pentane, hexane and heptane; alicyclic hydrocarbons such as cycrobutane, cyclopentane and cyclohexane; halogenated hydrocarbons such as chlorodifluoromethane, dichloromethane, dichlorofluoromethane, dichlorodifluoromethane, trichlorofluoromethane, chloroethane, dichlorotrifluoroethane, dichlorotetrafluoroethane, tichlorotrifluoroethane, tetrachlorodifluoroethane and perfluorocycrobutane; inorganic gases such as carbon dioxide, nitrogen and air.

An amount of the foaming agent is selected according to the kind of the foaming agent and the desired foaming ratio. Generally, the amount is preferably 1 to 100 parts by weight based on 100 parts by weight of the resin.

In order to control the cell diameter, if necessary, the known foaming nucleic agent such as sodium bicarbonate-citric acid or talc may be used in a combination use thereof.

A density of the foamed extrusion article is 50 to 10 $kg/m^3$, preferably 40 to 12 $kg/m^3$. When it is less than 10 $kg/m^3$, the foamed article becomes too flexible and the strength as the foamed article becomes insufficient. When it is more than 50 $kg/m^3$, properties such as heat insulation and cushioning property are difficult to be obtained. On the other hand, the closed cell ratio of the foamed extrusion article is more than 40%, preferably 50% to 100%. If it is less than 40%, the foamed article has a low compressive strength.

Next, the foamed article of the present invention is explained based on Examples and Comparative Examples, but the present invention is not limited thereto.

Resin properties of the polypropylene resin were measured and the foamed article was evaluated as follows.

<Method for Measuring Resin Properties>

Using a melt tension tester available from Toyo Seiki Co., Ltd., a polypropylene resin heated to 230° C. is extruded from an orifice having a diameter of 1 mm, a length of 10 mm, and an inflow angle of 45° at a rate of 10 mm/min. Then, the extrudate is taken up while it is accelerated from 1 m/min by passing a pulley for the tension detection to measure the tension required for taking up until the extrudate is broken. The tension at breakage was designated as the melt tension of the relevant polypropylene resin.

<Method for Evaluating the Foamed Article>

A density, a closed cell ratio, and an average cell diameter of the foamed plate were measured by the following methods to evaluate the appearance thereof by visible observation on the basis of the following evaluation criteria.

Density of the foamed article: To be calculated from a weight and a volume measured by immersing the article in water.

Closed cell ratio: To be measured according to ASTM D-2856 by using Multipicnometer (available from Yuasa Ionics Co., Ltd.).

Average cell diameter: Cell chord lengths on a straight line in thickness direction, width direction, and extrusion direction at the center of the foamed article are measured. It shows an average of three directions by multiplying 1.626.

Cell diameter=1.626×cell chord length on a straight line

Evaluation criteria of an appearance:

○: To be free of unfoamed section, fluff, or winkle.

×: To be able to identify unfoamed section, fluff, or wrinkle.

EXAMPLE 1

To 100 parts by weight of ethylene random polypropylene (available from Mitsui Chemicals, Inc., Hipole B230, MI at 230° C.=0.5, ethylene content 3% by weight) were added 0.5 parts by weight of 1,1-bis(t-butyl peroxy)3,3,5-trimethyl cyclohexane as a radical generating agent (available from NOF Corp., Perbutyl 3M, one minute half-life temperature: 147° C.). They were mixed and stirred for 10 minutes by using a ribbon blender. The mixture was fed from a hopper of twin-screw extruder (TEX44) available from The Japaan Steel Works, Ltd., at a feed rate of 50 kg/h. From an introducing part equipped at the midst, 2.5 parts by weight of an isoprene monomer (guaranteed, available from Wako Pure Chemical Industries, Ltd.) was fed by a fixed-rate pump at a rate of 1.25 kg/h (a ratio to achieve 2.5 parts by weight based on 100 parts by weight of ethylene random polypropylene). The obtained rod-like modified polypropylene resin having a diameter of about 4 mm was cooled by water, and cut into 3 mm thickness to obtain the modified polypropylene resin pellets. Table 1 shows the melt tension of the resin.

The twin-screw extruder is a coaxial type with twin screw, a cylinder hole diameter of 44 mm φ and the maximum effective screw length (L/D) is 28. Temperatures of the cylinder section of the twin-screw extruder were set to 160° C. at the feed section, 180° C. at the isoprene supplying section, and 200° C. thereafter. The screw rotating speed was set to 150 rpm. An average retention time after the isoprene supplying section was set to about 1 minute.

After dry-blending 65 parts by weight of the modified polypropylene resin, 35 parts by weight of polystyrene (available from Asahi Chemical Industry Co., Ltd., Stylon G9305, MFR:1.5), 5 parts by weight of SEPS (available from Kuraray Co., Ltd., Septon 2104, styrene content:65% by weight), and 0.3 parts by weight of mica powder by a ribbon blender, the mixture was supplied to the 65 mm to 90 mm tandem type extruder at a rate of 50 kg/h. After plasticizing at 200° C. in the first step extruder (65 mm), 15 parts by weight of isobutane as a foaming agent were pressure-fed based on 100 parts by weight of the mixed resin. The mixture was cooled in the second step extruder (90 mm) to 136° C. of the resin temperature, and it was extruded from a rectangular die with a slit width of 4 mm, a slit thickness of 3.0 mm and a land length of 30 mm. The foamed board was obtained by passing a molding die having 25 mm thickness directly connected to the rectangular die. Table 2 shows the properties of the foamed article.

TABLE 1

|  | Melt tension (230° C.:N) |
|---|---|
| modified polypropylene resin | 0.075 |
| SD613 | 0.068 |
| ethylene random PP | 0.042 |

EXAMPLE 2

Modified polypropylene resin pellets were obtained in the same manner as in Example 1.

A foamed board was obtained in the same method as in Example 1 excepting that a ratio of the modified polypropylene resin to polystyrene same as in Example 1 was changed a ratio of 80 parts by weight to 20 parts by weight. Table 2 shows the properties of the foamed article.

EXAMPLE 3

Modified polypropylene resin pellets were obtained in the same manner as in Example 1.

A foamed board was obtained in the same method as in Example 1 excepting that SEPS was changed (Septon 2007 available from Kuraray Co., Ltd., styrene content: 30% by weight). Table 2 shows the properties of the foamed article.

EXAMPLE 4

A foamed board was obtained in the same method as in Example 1 excepting that the polypropylene resin was changed (SD613 available from Montel, melt tension: 0.07 N). Table 2 shows the properties of the foamed article.

EXAMPLE 5

Modified polypropylene resin pellets were obtained in the same manner as in Example 1.

A foamed board was obtained in the same method as in Example 1 excepting that SEPS was changed to SEBS (Crayton G1652 available from Shell Japan Co.Ltd., styrene content: 29% by weight). Table 2 shows the properties of the foamed article.

EXAMPLE 6

Modified polypropylene resin pellets were obtained in the same manner as in Example 1.

A foamed board was obtained in the same method as in Example 1 excepting that a ratio of the modified polypropylene resin to polystyrene same as in Example 1 was changed to a ratio of 80 parts by weight to 20 parts by weight, and SEPS was changed to SEBS as in Example 5. Table 2 shows the properties of the foamed article.

Comparative Example 1

Modified polypropylene resin pellets were obtained in the same manner as in Example 1.

A foamed board was obtained in the same method as in Example 1 excepting that neither SEPS nor SEBS was used. Table 2 shows the properties of the foamed board. A foamed article with a low closed cell ratio was obtained.

Comparative Example 2

A foamed board was obtained in the same method as in Example 1 excepting that unmodified ethylene random polypropylene (available from Mitsui Chemicals, Inc., Hipole B230, melt flow index at 230° C.=0.5 g/10 minutes, ethylene content: 3% by weight) shown in Table 1 was used in place of the modified polypropylene resin. Table 2 shows the properties of the foam obtained. A foamed article with a low closed cell ratio was obtained.

Comparative Example 3

A foamed board was obtained in the same method as in Example 1 excepting that unmodified ethylene random polypropylene used in Comparative Example 2 was used in place of the modified polypropylene resin and SEBS used in Example 5 was used in place of SEPS. Table 2 shows the properties of the foamed board. A foamed article with a low closed cell ratio was obtained.

TABLE 2

|  | density (kg/m$^3$) | Closed cell content (%) | Average cell diameter (mm) | thickness (mm) | appearance |
|---|---|---|---|---|---|
| Ex. No. 1 | 16 | 65 | 0.9 | 25 | ◯ |
| Ex. No. 2 | 17 | 60 | 1.1 | 24 | ◯ |
| Ex. No. 3 | 16 | 62 | 1.0 | 25 | ◯ |
| Ex. No. 4 | 17 | 58 | 1.0 | 25 | ◯ |
| Ex. No. 5 | 16 | 65 | 0.9 | 25 | ◯ |

TABLE 2-continued

|  | density (kg/m$^3$) | Closed cell content (%) | Average cell diameter (mm) | thickness (mm) | appearance |
| --- | --- | --- | --- | --- | --- |
| Ex. No. 6 | 18 | 59 | 1.0 | 24 | ○ |
| Com. Ex. No. 1 | 27 | 28 | 2.0 | 25 | X |
| Com. Ex. No. 2 | 20 | 12 | 2.2 | 25 | X |
| Com.Ex. No. 3 | 31 | 15 | 1.8 | 16 | X |

INDUSTRIAL APPLICABILITY

According to the present invention, a foamed article with a good appearance can be easily provided, which has a density of 50 to 10 kg/m$^3$, a closed cell ratio of at least 40%, and a thickness of at least 20 mm.

What is claimed is:

1. A foamed extrusion board having a density of 50 to 10 kg/m$^3$ and a closed cell ratio of at least 40%, which is obtained by mixing a mixed resin comprising (a) 50 to 95 parts by weight of a polypropylene resin having a melt tension at 230° C. of at least 0.05 N, (b) 50 to 5 parts by weight of a polystyrene resin, and (c) 0.5 to 15.0 parts by weight of a hydrogenated block copolymer of styrene, isoprene and styrene based on 100 parts by weight of the polypropylene resin (a) and the polystyrene resin (b) with a foaming agent in an extruder, and then releasing into a low pressure zone.

2. The foamed extrusion board of claim 1, wherein the polypropylene resin, is a modified polypropylene resin, which is modified with a monomer selected from the group consisting of isoprene, styrene and 1,3-butadiene, and a radical polymerization initiator.

3. A foamed extrusion board having a density of 50 to 10 kg/m$^3$ and a closed cell ratio of at least 40%, which is obtained by mixing a mixed resin comprising (a) 50 to 95 parts by weight of a polypropylene resin having a melt tension at 230° C. of at least 0.05 N, (b) 50 to 5 parts by weight of a polystyrene resin, and (c) 0.5 to 15.0 parts by weight of a hydrogenated block copolymer of styrene and butadiene based on 100 parts by weight of the polypropylene resin (a) and the polystyrene resin (b) with a foaming agent in an extruder, and then releasing into a low pressure zone, and wherein the polypropylene resin is the modified polypropylene resin, which is modified with a monomer selected from the group consisting of isoprene, styrene and 1,3-butadiene, and a radical polymerization initiator.

* * * * *